United States Patent
Morita et al.

(10) Patent No.: US 11,615,901 B2
(45) Date of Patent: *Mar. 28, 2023

(54) FERRITE SINTERED MAGNET

(71) Applicant: TDK Corporation, Tokyo (JP)

(72) Inventors: Hiroyuki Morita, Tokyo (JP);
Masanori Ikeda, Tokyo (JP);
Yoshitaka Murakawa, Tokyo (JP);
Shogo Muroya, Tokyo (JP)

(73) Assignee: TDK Corporation, Tokyo (JP)

( * ) Notice: Subject to any disclaimer, the term of this patent is extended or adjusted under 35 U.S.C. 154(b) by 383 days.

This patent is subject to a terminal disclaimer.

(21) Appl. No.: 16/777,940

(22) Filed: Jan. 31, 2020

(65) Prior Publication Data
US 2020/0251262 A1 Aug. 6, 2020

(30) Foreign Application Priority Data
Feb. 5, 2019 (JP) .............................. JP2019-018621

(51) Int. Cl.
*H01F 1/10* (2006.01)
*H01F 1/11* (2006.01)
(Continued)

(52) U.S. Cl.
CPC ........... *H01F 1/10* (2013.01); *C04B 35/2633* (2013.01); *C04B 35/2675* (2013.01); *H01F 1/0315* (2013.01)

(58) Field of Classification Search
CPC ... H01F 1/10; C01G 49/0036; C01G 49/0054; C04B 35/2633; C04B 35/2641;
(Continued)

(56) References Cited

U.S. PATENT DOCUMENTS 6,248,253 B1 * 6/2001 Taguchi .................... H01F 1/10
252/62.63
11,456,096 B2 * 9/2022 Morita .............. C04B 35/62685
(Continued)

FOREIGN PATENT DOCUMENTS

CN 110323026 A 10/2019
JP 2001-57305 A 2/2001
(Continued)

OTHER PUBLICATIONS

1610/KOLNP/2012 published Jan. 25, 2013.
Indian Office Action issued in Indian Patent Application No. 202044004315 dated Aug. 5, 2021.

*Primary Examiner* — Matthew E. Hoban
*Assistant Examiner* — Lynne Edmondson
(74) *Attorney, Agent, or Firm* — Faegre Drinker Biddle & Reath LLP (57) ABSTRACT

A ferrite sintered magnet comprises a plurality of main phase grains containing a ferrite having a hexagonal structure, wherein at least some of the main phase grains are core-shell structure grains each having a core and a shell covering the core; and wherein the minimum value of the content of La in the core is [La]c atom %; the minimum value of the content of Co in the core is [Co]c atom %; the maximum value of the content of La in the shell is [La]s atom %; the maximum value of the content of Co in the shell is [Co]s atom %; [La]c+[Co]c is 3.08 atom % or more and 4.44 atom % or less; and [La]s+[Co]s is 7.60 atom % or more and 9.89 atom % or less.

10 Claims, 6 Drawing Sheets

(51) Int. Cl.
*C04B 35/26* (2006.01)
*H01F 1/03* (2006.01)

(58) Field of Classification Search
CPC .......... C04B 35/62685; C04B 35/6281; C04B
2235/3274; C04B 2235/767; C04B
2235/3208; C04B 2235/3213; C04B
2235/3217; C04B 2235/3227; C04B
2235/3277; C04B 2235/3409; C04B
2235/3418; C01P 2002/52; C01P 2004/84
See application file for complete search history.

(56) References Cited

U.S. PATENT DOCUMENTS

| | | |
|---|---|---|
| 2012/0280167 A1 | 11/2012 | Yanagida et al. |
| 2014/0097378 A1 | 4/2014 | Yanagida et al. |
| 2015/0170811 A1 | 6/2015 | Tanigawa et al. |
| 2015/0221424 A1 | 8/2015 | Kobayashi et al. |
| 2015/0262741 A1* | 9/2015 | Oda .................... C04B 35/6262 264/611 |
| 2019/0252100 A1 | 8/2019 | Kim et al. |
| 2019/0304641 A1 | 10/2019 | Morita et al. |

FOREIGN PATENT DOCUMENTS

| | | |
|---|---|---|
| JP | 3263694 B2 | 3/2002 |
| JP | 2011-213575 A | 10/2011 |
| JP | 2015-130493 A | 7/2015 |
| KR | 10-2017-0142776 A | 12/2017 |
| WO | WO-2014/021149 A1 | 2/2014 |
| WO | WO-2014/021426 A1 | 2/2014 |

\* cited by examiner

FERRITE SINTERED MAGNET

TECHNICAL FIELD

The present invention relates to a ferrite sintered magnet.

BACKGROUND

Ferrite sintered magnets such as hexagonal magnetoplumbite type (M type) Sr ferrites or Ba ferrites are known as permanent magnets formed from oxides (see Japanese Unexamined Patent Publication No. 2001-57305). As indices for evaluating magnetic properties of permanent magnets, residual magnetic flux density (Br) and coercivity (HcJ) are usually used.

SUMMARY

The present invention has an object to provide a ferrite sintered magnet having a high residual magnetic flux density.

The ferrite sintered magnet according to one aspect of the present invention is a ferrite sintered magnet comprising a plurality of main phase grains containing a ferrite having a hexagonal structure, wherein at least some of the main phase grains are core-shell structure grains each having a core and a shell covering the core, and wherein the minimum value of the content of La in the core is represented by [La]c atom %; the minimum value of the content of Co in the core is represented by [Co]c atom %; the maximum value of the content of La in the shell is represented by [La]s atom %; the maximum value of the content of Co in the shell is represented by [Co]s atom %; [La]c+[Co]c is 3.08 atom % or more and 4.44 atom % or less; and [La]s+[Co]s is 7.60 atom % or more and 9.89 atom % or less.

([La]s+[Co]s)/([La]c+[Co]c) may be 1.75 or more and 2.69 or less.

The maximum value of the content of Sr in the core may be represented by [Sr]c atom %, and the minimum value of the content of Sr in the shell may be represented by [Sr]s atom %; and [Sr]c may be higher than [Sr]s.

The minimum value of the content of Ca in the core may be represented by [Ca]c atom %, and the maximum value of the content of Ca in the shell may be represented by [Ca]s atom %; and [Ca]s may be higher than [Ca]c.

The maximum value of the content of Sr in the core may be represented by [Sr]c atom %, and the minimum value of the content of Ca in the core may be represented by [Ca]c atom %; and [Sr]c may be higher than [Ca]c.

The minimum value of the content of Sr in the shell may be represented by [Sr]s atom %, and the maximum value of the content of Ca in the shell may be represented by [Ca]s atom %; and [Ca]s may be higher than [Sr]s.

At least some of metal components contained in the ferrite sintered magnet may be represented by formula (1) wherein R in the formula (1) may be at least one element selected from the group consisting of rare earth elements and Bi, and R may include at least La; w, x, y, z and m in the formula (1) may satisfy formulae (2), (3), (4), (5), (6), (7), (8) and (9); and the ferrite sintered magnet may contain a Si component.

$$Ca_{1-w-x-y}R_wSr_xBa_yFe_zCo_m \quad (1)$$

$$0.25 < w < 0.5 \quad (2)$$

$$0.01 < x < 0.35 \quad (3)$$

$$0 \le y < 0.013 \quad (4)$$

$$y < x \quad (5)$$

$$8.5 < z < 9.9 \quad (6)$$

$$1.0 < w/m < 2.1 \quad (7)$$

$$0.017 < m/z < 0.055 \quad (8)$$

$$0 < 1-w-x-y < 1 \quad (9)$$

w, x and m in the formula (1) may satisfy formulae (2a), (3a) and (10); and the content of B in the ferrite sintered magnet may be 0.037 to 0.181% by mass in terms of $H_3BO_3$.

$$0.350 < w < 0.420 \quad (2a)$$

$$0.120 < x < 0.180 \quad (3a)$$

$$0.200 < m < 0.280 \quad (10)$$

The content of Al in the ferrite sintered magnet may be 0.05 to 0.3% by mass in terms of $Al_2O_3$.

According to the present invention, there is provided a ferrite sintered magnet having a high residual magnetic flux density.

DETAILED DESCRIPTION

Hereinafter, suitable embodiments of the present invention will be described by reference to the drawings. In the explanation of the drawings, the same reference sign will be attached to the same element and duplicated explanation will be omitted. The present invention is not any more limited to the following embodiments.

Ferrite Sintered Magnet

Figure 1A:
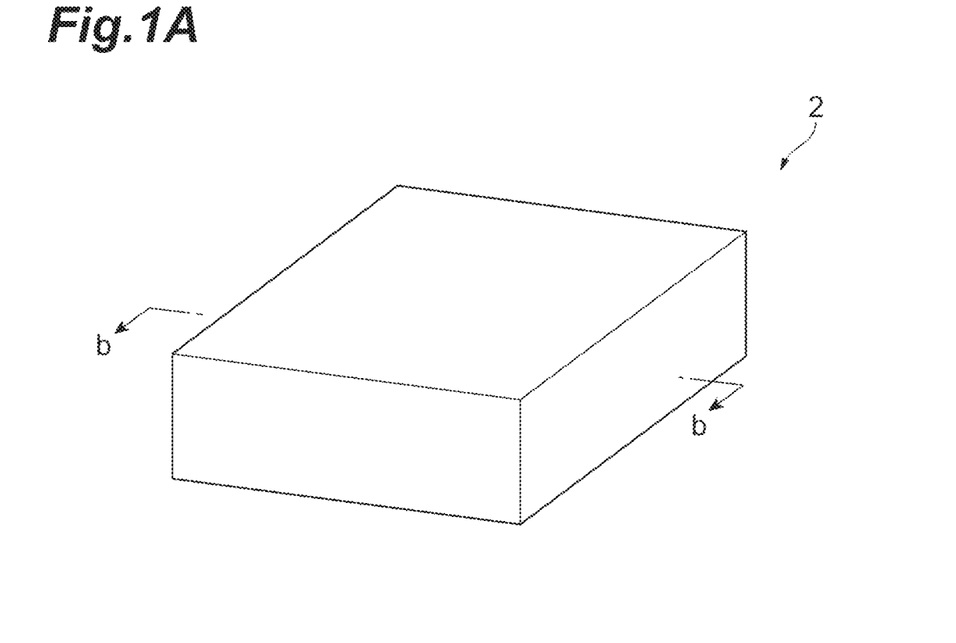
FIG. 1A is a schematic perspective view of a ferrite sintered magnet according to one embodiment of the present invention.
Figure 1B:
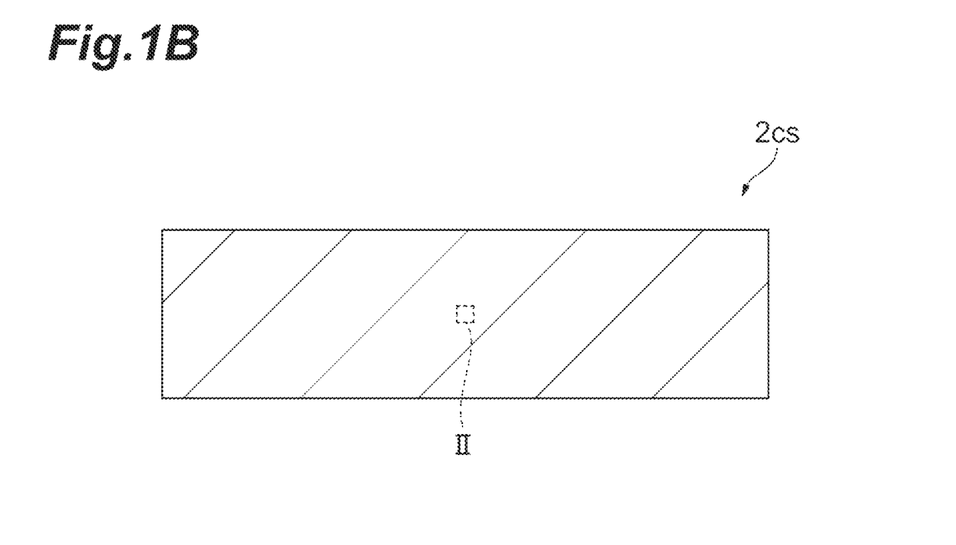
FIG. 1B is a schematic view (arrow view in the b-b line direction) of a cross section of the ferrite sintered magnet shown in FIG. 1A.
Figure 2:
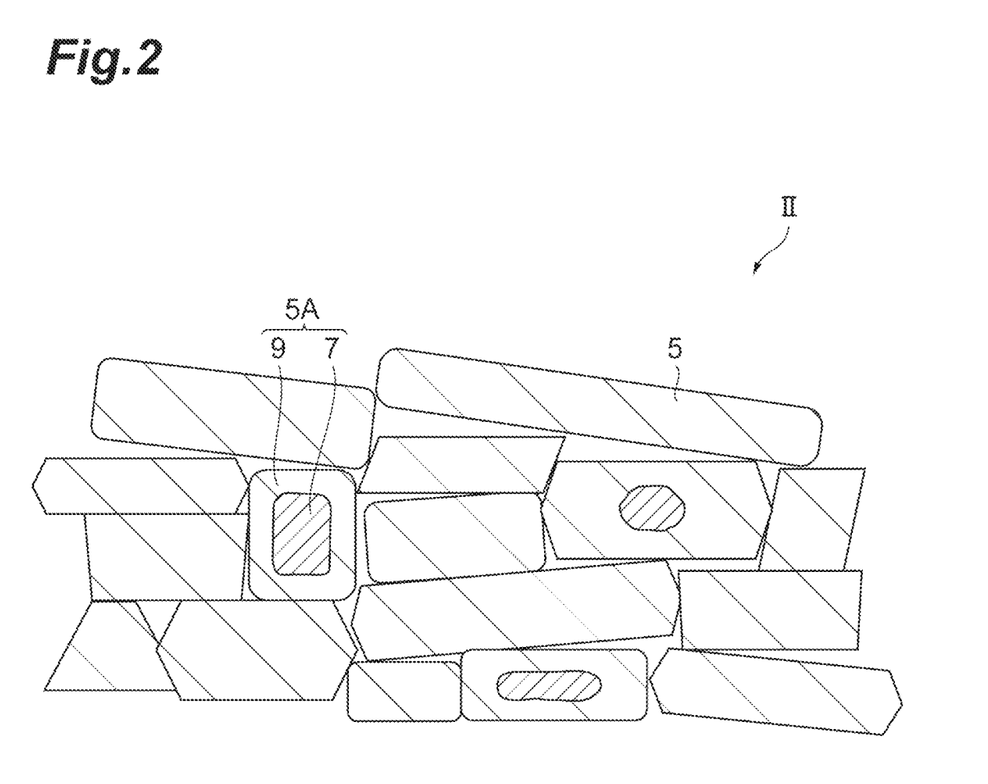
FIG. 2 is a schematic enlarged view of a part (region II) of the cross section of the ferrite sintered magnet shown in FIG. 1B.

FIG. 1A is a schematic perspective view of a cuboidal ferrite sintered magnet 2 (ferrite permanent magnet) according to the present embodiment; FIG. 1B is a schematic view of a cross section 2cs of the ferrite sintered magnet 2; and FIG. 2 is an enlarged view of a part (region II) of the cross section 2cs of the ferrite sintered magnet 2. The shape of the ferrite sintered magnet 2 is not limited to a cuboid. The shape of the ferrite sintered magnet 2 may be, for example, one selected from the group consisting of arc segment shapes, C shapes, tile shapes, flat plate shapes, columnar shapes and bow shapes.

As shown in FIG. 2, the ferrite sintered magnet 2 comprises a plurality of main phase grains 5 (grains) containing a ferrite having a hexagonal structure. The ferrite sintered magnet 2 comprises the plurality of main phase grains 5 and grain boundary phases positioned between the plurality of main phase grains 5. The proportion of the volume of the main phase grains 5 in the ferrite sintered magnet 2 may be, for example, 90% by volume or more and less than 100% by volume, or 95% by volume or more and less than 100% by volume, so that the magnetic properties of the ferrite sintered magnet 2 are easily improved.

The main phase grains 5 may be crystalline. The main phase grains 5 may contain a magnetoplumbite type (M type) ferrite having a hexagonal structure as a main phase (ferrite phase). At least some of metal components contained in the ferrite sintered magnet 2 (main phase grain 5) may be represented by formula (1). In other words, at least some of metal components constituting the magnetoplumbite type ferrite (main phase) may be represented by the formula (1).

$$Ca_{1-w-x-y}R_wSr_xBa_yFe_zCo_m \quad (1)$$

R in the formula (1) is at least one element selected from the group consisting of rare earth elements and Bi, and R includes at least La. The rare earth element may be at least one selected from the group consisting of Sc, Y, La, Ce, Pr, Nd, Pm, Sm, Eu, Gd, Tb, Dy, Ho, Er, Tm, Yb and Lu. In the case where the ferrite sintered magnet 2 contains La alone as R, the anisotropic magnetic field is easily formed in the ferrite sintered magnet 2 and the magnetic properties of the ferrite sintered magnet 2 are easily improved.

The ferrite sintered magnet 2 may contain, in addition to the metal components represented by the formula (1), at least one element selected from the group consisting of Mn, Mg, Ni, Cu and Zn. In the case where the ferrite sintered magnet 2 contains at least one selected from the group consisting of Mn, Ni and Zn, and Co, the magnetic properties of the ferrite sintered magnet 2 are more easily improved. In the case where the ferrite sintered magnet 2 contains Co alone as M, the anisotropic magnetic field is easily formed in the ferrite sintered magnet 2 and the magnetic properties of the ferrite sintered magnet 2 are especially easily improved.

The atomic ratios (molar ratios) w, x, y, z and m in the formula (1) may satisfy formulae (2), (3), (4), (5), (6) (7), (8) and (9).

$$0.25 < w < 0.5 \quad (2)$$

$$0.01 < x < 0.35 \quad (3)$$

$$0 \leq y < 0.013 \quad (4)$$

$$y < x \quad (5)$$

$$8.5 < z < 9.9 \quad (6)$$

$$1.0 < w/m < 2.1 \quad (7)$$

$$0.017 < m/z < 0.055 \quad (8)$$

$$0 < 1-w-x-y < 1 \quad (9)$$

The magnetoplumbite type ferrite contained in the main phase grain 5 is an oxide of the metal components represented by the formula (1). The magnetoplumbite type ferrite may be represented, for example, by the formula (1a). The molar ratio of O in formula (1a), however, is not limited to 19, and the atomic ratio (molar ratio) of O may be a value other than 19 as long as the hexagonal structure of the magnetoplumbite type ferrite is held. That is, in part of the ferrite sintered magnet 2 or the main phase grains 5, the atomic ratio (molar ratio) of O may scatter in the vicinity of 19.

$$Ca_{1-w-x-y}R_wSr_xBa_yFe_zCo_mO_{19} \quad (1a)$$

The ferrite sintered magnet 2 contains at least Si as a sub-component other than the above-mentioned main phase. When the metal components contained in the ferrite sintered magnet 2 (main phase grains 5) are represented by the formula (1), and the ferrite sintered magnet 2 contains the Si component, Br and HcJ of the ferrite sintered magnet 2 are easily increased and Hk/HcJ of the ferrite sintered magnet 2 is easily made to be 1. There will be described later the relation between each of the formulae (2), (3), (4), (5), (6) (7), (8) and (9), and the magnetic properties of the ferrite sintered magnet 2.

As shown in FIG. 2, out of the plurality of the main phase grains 5 contained in the ferrite sintered magnet 2, at least some of the main phase grains 5 may be core-shell structure grains 5A each having a core 7 and a shell 9 covering the core 7. Only a part of the surface of the core 7 may be covered with the shell 9. In other words, the other part of the surface of the core 7 may contact with the grain boundary phases without being covered with the shell 9. The entire of the core 7 may be covered with the shell 9. The core-shell structure grain 5A may include a plurality of the cores 7.

Figure 3A:
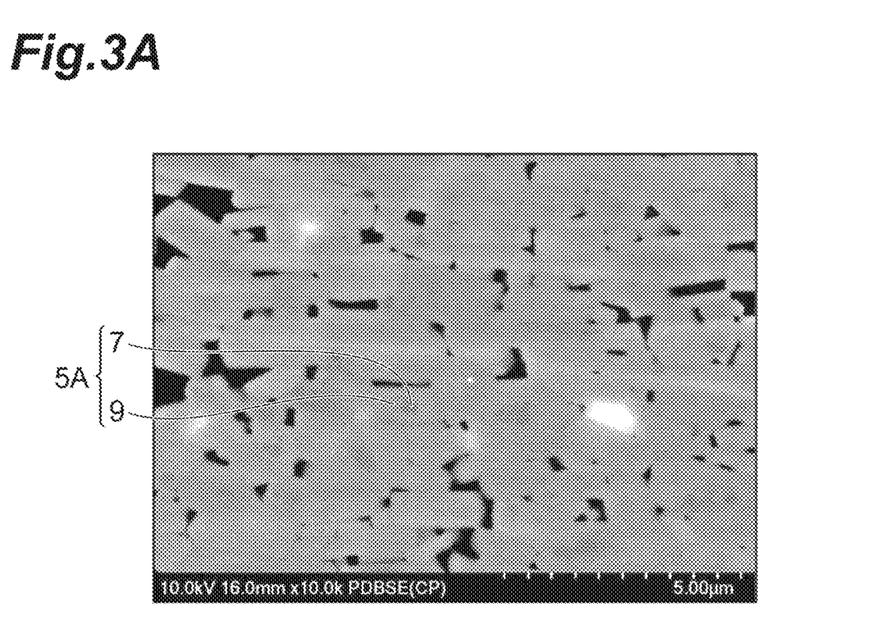
FIG. 3A is an image (a cross section photographed by a scanning electron microscope) of a part of a cross section of a ferrite sintered magnet of Example 1 of the present invention.

The core-shell structure grains 5A and the main phase grains 5 other than the core-shell structure grains 5A can be distinguished in an image of a cross section 2cs of the ferrite sintered magnet 2 photographed by a scanning electron microscope (SEM). For example, as shown in FIG. 3A, in the cross section of the ferrite sintered magnet 2 photographed by SEM, the color of the core 7 is deeper than the color of the shell 9 surrounding the core 7. That is, in a cross section of the core-shell structure grain 5A photographed by SEM, the core 7 and the shell 9 clearly distinguishable by a shade of color are observed. The shade of color between the core 7 and the shell 9 is caused by the difference in composition between the core 7 and the shell 9. By contrast, the color of the main phase grains 5 other than the core-shell structure grains 5A is nearly solid. That is, the composition of the interior of the main phase grains other than the core-shell structure grains 5A may be nearly uniform. In the interior of the main phase grains 5 other than the core-shell structure grains 5A, there may be a gradient of concentration of or an unevenness of at least one element selected from the group consisting of La, Co, Sr, Ca, R, Ba, Fe and M.

The minimum value of the content of La in the core 7 is represented by [La]c atom %. The minimum value of the content of Co in the core 7 is represented by [Co]c atom %. The maximum value of the content of Sr in the core 7 is represented by [Sr]c atom %. The minimum value of the content of Ca in the core 7 is represented by [Ca]c atom %.

The maximum value of the content of La in the shell 9 is represented by [La]s atom %. The maximum value of the content of Co in the shell 9 is represented by [Co]s atom %.

The minimum value of the content of Sr in the shell 9 is represented by [Sr]s atom %. The maximum value of the content of Ca in the shell 9 is represented by [Ca]s atom %.

[La]c+[Co]c is 3.08 atom % or more and 4.44 atom % or less, and [La]s+[Co]s is 7.60 atom % or more and 9.89 atom % or less. When [La]c+[Co]c and [La]s+[Co]s are in the above ranges, it is easy for magnetic phases having high anisotropy to be present in the vicinity of the surface of the core-shell structure grains, and the ferrite sintered magnet can have a high residual magnetic flux density. In the case where [La]c+[Co]c is less than 3.08 atom %, it is difficult for the ferrite sintered magnet to have a sufficiently high residual magnetic flux density. Also in the case where [La]s+[Co]s is less than 7.60 atom %, it is difficult for the ferrite sintered magnet to have a sufficiently high residual magnetic flux density.

([La]s+[Co]s)/([La]c+[Co]c) may be 1.75 or more and 2.69 or less. When ([La]s+[Co]s)/([La]c+[Co]c) is in the above range, it is easy for magnetic phases having high anisotropy to be present in the vicinity of the surface of the core-shell structure grains, and it is easy for the ferrite sintered magnet to have a high residual magnetic flux density.

The proportion of the number of the core-shell structure grains 5A to the total number of the main phase grains 5 contained in the ferrite sintered magnet 2 may be 1% or more and 100% or less, 5% or more and 100% or less, 10% or more and 100% or less, 14.3% or more and 100% or less, 15% or more and 100% or less, 20% or more and 100% or less, 21.4% or more and 100% or less, 25% or more and 100% or less, 30% or more and 100% or less, 35% or more and 100% or less, 40% or more and 100% or less, 45% or more and 100% or less, or 50% or more and 100% or less. In the case where the proportion of the number of the core-shell structure grains 5A is in the above range, both of Br and HcJ of the ferrite sintered magnet 2 are easily increased.

The proportion of the number of the core-shell structure grains 5A may be calculated from numbers of the main phase grains 5 and of the core-shell structure grains 5A observed in a region (visual field region by a scanning electron microscope) randomly selected from a cross section of the ferrite sintered magnet 2. The proportion of the number of the core-shell structure grains 5A may also be calculated from the number of the core-shell structure grains 5A contained in 50 or more main phase grains 5 as the total number thereof randomly selected.

The core 7 may contain La, Sr, Co and Ca. The shell 9 may also contain La, Sr, Co and Ca. In the core 7 and the shell 9, by making part of Fe to be substituted by Co, the magnetic properties of the ferrite sintered magnet 2 are easily improved. In the core 7 and the shell 9, by making part of La to be substituted by Sr or Ca, the magnetic properties of the ferrite sintered magnet 2 are easily improved.

[Sr]c may be higher than [Sr]s. That is, the content of Sr in the core 7 may be likely to be higher than the content of Sr in the shell 9. [Ca]s may be higher than [Ca]c. That is, the content of Ca in the shell 9 may be likely to be higher than the content of Ca in the core 7. [Sr]c may be higher than [Ca]c. That is, the content of Sr in the core 7 may be likely to be higher than the content of Ca in the core 7. [Ca]s may be higher than [Sr]s. That is, the content of Ca in the shell 9 may be likely to be higher than the content of Sr in the shell 9. When the contents of Sr and Ca in the core 7 and the shell 9, respectively, have the above likelihoods, both of Br and HcJ of the ferrite sintered magnet 2 are easily increased.

[La]c may be, for example, 1.40 atom % or more and 2.08 atom % or less. [Co]c may be, for example, 1.69 atom % or more and 2.36 atom % or less. [Sr]c may be, for example, 3.04 atom % or more and 6.56 atom % or less. [Ca]c may be, for example, 0.94 atom % or more and 1.71 atom % or less. [La]s may be, for example, 3.96 atom % or more and 5.44 atom % or less. [Co]s may be, for example, 3.57 atom % or more and 4.45 atom % or less. [Sr]s may be, for example, 0.62 atom % or more and 1.59 atom % or less. [Ca]s may be, for example, 2.74 atom % or more and 3.88 atom % or less.

The distribution of the content of La in the core 7 may be uniform, or may have a gradient. The distribution of the content of La in the shell 9 may be uniform, or may have a gradient. The distribution of the content of Co in the core 7 may be uniform, or may have a gradient. The distribution of the content of Co in the shell 9 may be uniform, or may have a gradient. The distribution of the content of Sr in the core 7 may be uniform, or may have a gradient. The distribution of the content of Sr in the shell 9 may be uniform, or may have a gradient. The distribution of the content of Ca in the core 7 may be uniform, or may have a gradient. The distribution of the content of Ca in the shell 9 may be uniform, or may have a gradient.

The average particle sizes of the main phase grains 5 and the core-shell structure grains 5A are each preferably 0.5 μm or more and 1.5 μm or less, more preferably 0.5 μm or more and 1.0 μm or less. When the main phase grains 5 and the core-shell structure grains 5A each have the above average particle size, HcJ of the ferrite sintered magnet 2 is easily increased. The average particle sizes of the main phase grains 5 and the core-shell structure grains 5A may be each measured by observing a cross section 2cs of the ferrite sintered magnet 2 by a scanning electron microscope. The thickness of the shell 9 of the core-shell structure grains 5A is not limited as long as being smaller than the particle diameter of the core-shell structure grains 5A. The maximum diameter of the core 7 of the core-shell structure grains 5A is not limited as long as being smaller than the particle diameter of the core-shell structure grains 5A.

The atomic ratio (1-w-x-y) of Ca may be more than 0.05 and less than 0.59. When the atomic ratio of Ca is too low, the crystal structure (hexagonal structure) of the M type ferrite is hardly formed. Further when the atomic ratio of Ca is too low, it is easy for the proportion of $\alpha$-$Fe_2O_3$ being non-magnetic phases in the ferrite sintered magnet 2 to be increased, and it becomes easy for non-magnetic heterophases such as orthoferrite to be formed because R becomes surplus. Therefore, when the atomic ratio of Ca is too low, the magnetic properties (particularly Br and HcJ) of the ferrite sintered magnet 2 are easily reduced. On the other hand, when the atomic ratio of Ca is too high, the crystal structure (hexagonal structure) of the M type ferrite is hardly formed. Further when the atomic ratio of Ca is too high, the proportion of non-magnetic phases ($CaFeO_{3-x}$ and the like) in the ferrite sintered magnet 2 is easily increased. As a result, the magnetic properties of the ferrite sintered magnet 2 are easily reduced.

When the atomic ratio (w) of R satisfies 0.25<w<0.5, Br and HcJ are easily increased, and Hk/HcJ is easily made to be 1. Hk refers to a magnetic field corresponding to 90% of Br. When the atomic ratio of R is too low, M is hardly dissolved as a solid solution in the ferrite sintered magnet 2 and Br and HcJ are likely to be decreased. On the other hand, when the atomic ratio of R is too high, non-magnetic hetero-phases such as orthoferrite are easily formed in the ferrite sintered magnet 2 and Hk/HcJ is easily reduced.

When the atomic ratio (x) of Sr satisfies 0.01<x<0.35, Br and HcJ are easily increased and Hk/HcJ is easily made to be 1. When the atomic ratio of Sr is too low, the atomic ratios of Ca and/or La become relatively high, Hk/HcJ is easily reduced. On the other hand, when the atomic ratio of Sr is too high, Br and HcJ are easily reduced.

When the atomic ratio (y) of Ba satisfies 0.0002<y<0.011, Br and HcJ are easily increased and Hk/HcJ is easily made to be 1. When the atomic ratio of Ba is too low, Hk/HcJ is hardly made to be 1. Here, even if the atomic ratio of Ba is zero, the advantageous effects of the present invention can be attained. On the other hand, when the atomic ratio of Ba is too high, Br and HcJ are easily reduced. From these viewpoints, the atomic ratio (y) of Ba may satisfy $0.0006 \le y \le 0.010$.

The atomic ratio (x) of Sr and the atomic ratio (y) of Ba may satisfy y<x. When the atomic ratio of Sr is higher than the atomic ratio of Ba, Br is easily increased and Hk/HcJ is easily made to be 1.

When the atomic ratio (z) of Fe satisfies 8.5<z<9.9, Br and HcJ are easily increased and Hk/HcJ is easily made to be 1. When the atomic ratio of Fe is too low, Br and HcJ are easily reduced. Also in the case where the atomic ratio of Fe is too high, Br and HcJ are easily reduced.

When w/m satisfies 1.0<w/m<2.1 and m/z satisfies 0.017<m/z<0.055, Br and HcJ are easily increased, and Hk/HcJ is easily made to be 1. In the case where the atomic ratio (m) of M is too low, Br and HcJ are easily decreased. Particularly in the case where the ratio of Co is too low, HcJ is easily reduced. On the other hand, also in the case where the ratio of M is too high, Br and HcJ are easily reduced. From these viewpoints, w/m may satisfy $1.2 \le w/m \le 2.0$ or $1.5 \le w/m \le 1.8$, and m/z may satisfy $0.02 \le m/z \le 0.05$ or $0.022 \le m/z \le 0.04$.

The Si component contained as a sub-component in the ferrite sintered magnet 2 may function as a sintering auxiliary agent to promote sintering of the main phase grains 5 in the manufacturing process of the ferrite sintered magnet 2. That is, by using the Si component as a raw material of the main phase grains 5, the main phase grains 5 are easily sintered in the manufacturing process (firing step) of the main phase grains 5 and the grain size of the main phase grains 5 is suitably regulated, so that it becomes easy for the magnetic properties of the ferrite sintered magnet 2 to be controlled. As a result, Br and HcJ of the ferrite sintered magnet 2 are easily increased and Hk/HcJ is easily made to be 1. The content of the Si component in the ferrite sintered magnet 2 may be, in terms of $SiO_2$, 0.1 to 3 parts by mass based on 100 parts by mass of the main phase. In the case where the content of the Si component is in the above range, HcJ of the ferrite sintered magnet 2 is easily increased. The composition of the Si component is not especially limited. The Si component may be added, for example, as $SiO_2$, $Na_2SiO_3$ or $SiO_2 \cdot nH_2O$, to the raw materials of the main phase of the ferrite sintered magnet 2.

w, x, z and m in the formula (1) may satisfy formulae (2a), (3a), (4a) and (10), and the content of B in the ferrite sintered magnet 2 may be 0.037 to 0.181% by mass in terms of $H_3BO_3$.

$$0.350 < w < 0.420, \text{ preferably } 0.360 \le w \le 0.420 \quad (2a)$$

$$0.120 < x < 0.180, \text{ preferably } 0.110 \le x \le 0.173 \quad (3a)$$

$$8.51 \le z \le 9.71 \quad (4a)$$

$$0.200 < m < 0.280, \text{ preferably } 0.208 \le m \le 0.269 \quad (10)$$

When the atomic ratio (w) of R satisfies the formula (2a); the atomic ratio (x) of Sr satisfies the formula (3a); the atomic ratio (z) of Fe satisfies the formula (4a); and the atomic ratio (m) of Co satisfies the formula (10), Br and HcJ are easily increased, and Hk/HcJ is easily made to be 1. In the case where m exceeds 0.200, particularly HcJ is easily increased.

In the case where w, x, z and m in the formula (1) satisfy the formulae (2a), (3a), (4a) and (10), the content of Al in the ferrite sintered magnet 2 may be, in terms of $Al_2O_3$, 0.05 to 0.3% by mass or 0.03 to 0.3% by mass. When the content of Al is 0.05% by mass or more or 0.03% by mass or more, there is suppressed the grain growth in the calcination time of a raw material powder of the ferrite sintered magnet 2, and the coercivity of the ferrite sintered magnet 2 to be obtained is easily increased. When the content of Al is 0.3% by mass or less, Br and HcJ are easily increased.

In the case where w, x, z and m in the formula (1) satisfy the formulae 2a), (3a), (4a) and (10), the content of Ba in the ferrite sintered magnet 2 may be, in toms of BaO, 0.001 to 0.077% by mass or 0.001 to 0.068% by mass.

Even in the case where x, y, z, w and m are out of the above ranges, the advantageous effects of the present invention can be attained.

The ferrite sintered magnet 2 may further contain Cr, Ga, Mg, Cu, Mn, Ni, Zn, In, Li, Ti, Zr, Ge, Sn, V, Nb, Ta, Sb, As, W, Mo and the like. It is preferable that the content of each element is, in terms of oxide, 3% by mass or less; and being 1% by mass or less is more preferable. Further from the viewpoint of avoiding decreases in the magnetic properties, it is preferable that the total content of these elements is made to be 2% by mass or less.

It is preferable that the ferrite sintered magnet 2 contains no alkali metal elements (Na, K, Rb and the like) as sub-components. The alkali metal elements are likely to decrease the saturation magnetization of the ferrite sintered magnet 2. It is to be noted that there are cases where the alkali metal elements are contained, for example, in a raw material for obtaining the ferrite sintered magnet 2, and the alkali metal elements may be contained in the ferrite sintered magnet 2 as long as to a degree of being contained inevitably as seen in such cases. The content of the alkali metal elements, which do not largely affect the magnetic properties, is 3% by mass or less.

The above-mentioned sub-components may be contained at least in the grain boundary phases out of the main phase grains 5 (main phase grains) and the grain boundary phases. The above-mentioned sub-components may be contained in both of the main phase grains 5 (main phase grains) and the grain boundary phases.

The composition of the whole of the ferrite sintered magnet 2 may be specified, for example, by X-ray fluorescence analysis (XRF). The presence and the crystal structure of the main phase (M type ferrite) may be specified by X-ray diffraction or electron beam diffraction.

Method for Manufacturing the Ferrite Sintered Magnet

A method for manufacturing the ferrite sintered magnet according to the present embodiment may comprise a blend step, a calcination step, a pulverization step, a molding step and a firing step. Each step will be described hereinafter.

Blend Step

In the blend step, raw materials of the ferrite sintered magnet are blended to thereby obtain a raw material composition. First, the raw materials of the ferrite sintered magnet include compounds (raw material compounds) containing one or two or more elements among elements constituting the ferrite sintered magnet. It is preferable that the raw materials are powders. The raw material compounds include oxides of the respective elements, and compounds (carbonate salts, hydroxides, nitrate salts and the like) to become oxides by firing. The raw materials (raw material compounds) of the main phase may be, for example, $SrCO_3$, $La(OH)_3$, $Fe_2O_3$, $BaCO_3$, $CaCO_3$, $Co_3O_4$, $H_3BO_3$, $Al_2O_3$ and $SiO_2$. The raw materials of the main phase, as required, may be blended with other sub-components (simple elements, oxides and the like). The average particle sizes of powders of the raw material compounds may be around 0.1 to 2.0 µm, for example, from the viewpoint of enabling homogeneous blending.

The blending is performed, for example, by weighing each raw material in such a way as to coincide with the composition of the metal components represented by the formula (1). After each raw material is mixed, the resultant mixture of the raw materials may further be mixed and pulverized for around 0.1 to 20 hours by using a wet attritor, a ball mill or the like.

In order to reduce the number of the core-shell structure grains contained in the ferrite sintered magnet, it is better that the whole amount of the corresponding raw materials containing Ca, R(La), Sr, Fe and Co constituting the metal components (main phase) represented by the formula (1) are mixed collectively before the calcination step. In the case where raw materials of the main phase are further added to a calcined body obtained in the calcination step, in the firing step, the calcined body and the raw materials are together heated. Consequently, there is easily caused the difference (concentration gradient) in the content of each element constituting the metal components between in the vicinity and in the central portion of the main phase grains, and it becomes easy for the core-shell structure grains to be formed.

In the blend step, however, not all of the raw materials of the main phase may be mixed. In order to finely adjust and control the composition of the ferrite sintered magnet, raw materials of the main phase may further be added to a calcined body obtained in the calcination step. The Si component (for example, $SiO_2$) as a sub-component and La, Ca and Co ($La(OH)_3$, $CaCO_3$, $Co_3O_4$), which are constituent elements of the main phase, may be added to the calcined body in the pulverization step described later. The timing of the addition may be adjusted so that the desired composition and magnetic properties can easily be obtained.

Calcination Step

In the calcination step, the raw material powder obtained in the blend step is calcined. By the calcination step, a granular or massive calcined body is obtained. It is preferable that the calcination is performed, for example, in an oxidizing atmosphere such as air. The temperature of the calcination may be 1100 to 1400° C., 1100 to 1300° C. or 1100 to 1250° C. The time of the calcination may be 1 sec to 10 hours or 1 sec to 3 hours. The calcined body obtained by the calcination contains 70% or more of the main phase (M phase) as described above. The primary particle diameter of the main phase may be 10 µm or less or 2 µm or less.

Pulverization Step

In the pulverization step, the calcined body is pulverized and powdered again. Thereby, molding in the molding step is performed easily. In the pulverization step, in order to adjust and control the composition, raw materials or sub-components of the main phase may be added to the calcined body (afteraddition of raw materials). The pulverization step may be performed, for example, by pulverizing the calcined body to obtain a coarse powder, and thereafter further more finely pulverizing the coarse powder. That is, the pulverization step may be performed by the two-stage pulverization step of coarse pulverization and fine pulverization.

The coarse pulverization may use, for example, a vibrating mill. The average particle size of a powder (coarsely pulverized material) obtained by the coarse pulverization of the calcined body may be 0.5 to 5.0 µm. In the fine pulverization, the coarsely pulverized material is further pulverized by a wet attritor, a ball mill, a jet mill or the like. The average particle size of a finely pulverized material obtained by the fine pulverization may be around 0.08 to 2.0 µm, around 0.1 to 1.0 µm or around 0.2 to 0.8 µm. The specific surface area (BET specific surface area) of the finely pulverized material may be around 7 to 12 $m^2/g$. The suitable pulverization time depends on a pulverization method. For example, in the case of a wet attritor, the pulverization time may be 30 min to 10 hours. The time of wet pulverization by a ball mill may be around 10 to 50 hours.

In the fine pulverization step, part of the raw materials or the sub-components of the main phase may be added to the calcined body. There may be added, for example, a Ca component ($CaCO_3$), a La component ($La(OH)_3$), a Co component ($Co_3O_4$), a Si component ($SiO_2$) to the coarsely pulverized material. In the coarse pulverization step before the fine pulverization step, part of the raw materials may be added to the calcined body.

In the fine pulverization step, in order to raise the degree of magnetic orientation of a sintered body obtained after firing, it is preferable to add, for example, a polyhydric alcohol represented by the formula $C_n(OH)_nH_{n+2}$ to the coarsely pulverized material. Here, n in the polyhydric alcohol formula may be 4 to 100, 4 to 30, 4 to 20 or 4 to 12. Examples of the polyhydric alcohol include sorbitol. Then, two or more polyhydric alcohols may be used in combination. In addition to the polyhydric alcohol, other well-known dispersants may be further used in combination.

The amount of the polyhydric alcohol added may be 0.05 to 5.0% by mass, 0.1 to 3.0% by mass or 0.2 to 2.0% by mass on the basis of an object to which it is added (for example, the coarsely pulverized material). Here, the polyhydric alcohol added in the fine pulverization step is removed by thermal decomposition in the firing step described later.

Molding Step

In the molding step, the pulverized material (preferably, finely pulverized material) obtained in the pulverization step is molded in a magnetic field to thereby obtain a green compact. The molding can be performed by either method of dry molding and wet molding. From the viewpoint of raising the degree of magnetic orientation, the wet molding is preferable.

In the case of the wet molding, for example, the above-mentioned fine pulverization step is performed by a wet process to thereby obtain a slurry, which is thereafter concentrated to a predetermined concentration to thereby obtain a slurry for wet molding. It is preferable that the molding is performed by using this slurry for wet molding. The concentration of the slurry can be performed by centrifugal separation, filter press or the like. The content of the finely pulverized material in the slurry for wet molding may be 30 to 80% by mass. In the slurry, as a dispersion medium for dispersing the finely pulverized material, water is preferable. In this case, a surfactant such as gluconic acid, gluconate or sorbitol may be added to the slurry. Further as a dispersion medium, a nonaqueous solvent may be used. As the non-aqueous solvent, an organic solvent such as toluene or xylene can be used. In this case, it is preferable to add a surfactant such as oleic acid to the nonaqueous solvent. The slurry for wet molding may be prepared by adding a dispersion medium and the like to a dried finely pulverized material.

In the case where the slurry for wet molding is molded in a magnetic field, the molding pressure may be around 9.8 to 49 MPa (0.1 to 0.5 ton/cm$^2$), and the magnetic field to apply may be around 398 to 1194 kA/m (5 to 15 kOe).

Firing Step

In the firing step, the green compact obtained in the molding step is fired to thereby obtain a sintered body (ferrite sintered magnet). In the firing step, the main phase grains (pulverized material) contained in the green compact are mutually sintered to thereby form the ferrite sintered magnet.

The firing can be performed in an oxidizing atmosphere such as the air atmosphere. It is preferable that the firing temperature is 1050 to 1270° C.; and being 1080 to 1240° C. is more preferable. It is preferable that the firing time (time to be held at the firing temperature) is around 0.5 to 3 hours. It is preferable that the rate of temperature increase until the temperature of the firing atmosphere reaches the firing temperature is 0.5 to 5° C./min. It is preferable that the rate of temperature decrease when the temperature of the firing atmosphere is lowered from the firing temperature at the completion time of the firing step is 5.0 to 10.0° C./min. In the case where the firing temperature, the rate of temperature increase and the rate of temperature decrease are in the above ranges, it is easy for a proper amount of the core-shell structure grains to be formed. In the case where the firing temperature is too low, the main phase grains are not sufficiently sintered, making it difficult for the ferrite sintered magnet excellent in the magnetic properties to be obtained. In the case where the firing temperature is too high, abnormal grain growth occurs and the magnetic properties are reduced. A too-low rate of temperature increase is not preferable because much time is taken for the firing and an increase in the production cost is brought about. A too-high rate of temperature increase is not preferable because there arises a risk of reducing the magnetic properties. A too-low rate of temperature decrease is not preferable because there arises a risk of reducing the magnetic properties. A too-high rate of temperature decrease is not preferable because there arises a risk of forming cracks in the sintered body due to a rapid temperature difference.

In the case where the green compact is obtained by the wet molding, and fired without being sufficiently dried, there is such a possibility that rapid heating of the green compact volatilizes the dispersion medium and the like in the green compact extremely to crack the green compact. From the viewpoint of suppressing the cracks, the green compact, before being heated at the above firing temperature, may be sufficiently dried by being heated at a rate of temperature increase of around 0.5° C./min, for example, from room temperature to around 100° C. In the case where the green compact contains the surfactant (dispersant) and the like, the green compact may be heated at a rate of temperature increase of around 2.5° C./min, for example, in the temperature range of around 100 to 500° C., to remove the surfactant (dispersant) and the like (degreasing treatment). These heat treatments may be performed at the start of the firing step, or may also be performed as a separate step before the firing step.

The ferrite sintered magnet according to the present embodiment may be used, for example, for motors for cars, motors for OA/AV devices, motors for household appliances, motors for FA, generators for motorcycles, magnets for speakers and headphones, magnetrons, magnetic field generators for MRI, clampers for CD-ROM, sensors for distributors, sensors for ABS, fuel/oil level sensors, magnetic latches, isolators, and sputtering targets.

EXAMPLES

Hereinafter, the present invention will be described in more detail by way of Examples, but the present invention is not any more limited to these Examples.

Example 1 (Manufacturing of Ferrite Sintered Magnet)

As raw materials for the main phase of a ferrite sintered magnet, there were provided iron oxide ($Fe_2O_3$), calcium carbonate ($CaCO_3$), strontium carbonate ($SrCO_3$), cobalt oxide ($CO_3O_4$), barium carbonate ($BaCO_3$) and lanthanum hydroxide ($La(OH)_3$).

The above raw materials were each weighed so that the composition of metal components contained in the ferrite sintered magnet (main phase) was a composition represented by formula (1c). That is, the above raw materials were each weighed so that values of 1-w-x-y, w, x, y, z and m in formula (1c) were values indicated in Table 1. As a Si component (sub-component), silicon oxide ($SiO_2$) was provided. The proportion (unit: parts by mass) of $SiO_2$ based on 100 parts by mass of the total mass of the whole of the raw materials for the main phase was adjusted to a value indicated in Table 1. The above raw materials were mixed and pulverized by a wet attritor, and thereafter dried to thereby obtain a raw material powder.

$$Ca_{1-w-x-y}La_wSr_xBa_yFe_zCo_m \qquad (1c)$$

Calcination and Pulverization Steps

In a calcination step, the raw material powder was heated in the air atmosphere at 1200° C. for 2 hours to thereby obtain a calcined body. In a pulverization step, the calcined body was pulverized by a small-rod vibrating mill to thereby obtain a coarsely pulverized material. In order to exactly adjust the composition of the metal components contained in the coarsely pulverized material to the composition represented by the formula (1c), $CaCO_3$, $La(OH)_3$, $Co_3O_4$, $SiO_2$ and $Fe_2O_3$ were added to the coarsely pulverized material. That is, afteraddition of raw materials of the main phase was performed in the pulverization step. Then, the coarsely pulverized material was pulverized further for 32 hours by a wet ball mill to thereby obtain a slurry containing finely pulverized particles consisting of a calcined body. The slurry was dehydrated by a centrifugal separator to regulate the concentration of the solid content (finely pulverized particles consisting of a calcined body) to thereby obtain a slurry for wet molding.

Molding and Firing Steps

In a molding step, the slurry for wet molding was molded in an applied magnetic field of 10 kOe by using a wet magnetic field molding machine to thereby obtain a cylindrical green compact. The obtained green compact was fully dried in the air atmosphere at room temperature. In a firing step, the green compact was placed in a furnace filled with the air atmosphere. Then, the furnace interior was heated to raise the temperature of the furnace interior from room temperature to a firing temperature indicated in Table 2. The rate of temperature increase of the furnace interior from room temperature until reaching the firing temperature was regulated at a value indicated in Table 2. Then, the green compact was heated at a firing temperature indicated in Table 2 for 1 hour. Then, the furnace interior was cooled to lower the temperature thereof from the firing temperature to room temperature. The rate of temperature decrease of the temperature of the furnace interior from the firing temperature down to room temperature was regulated at a value indicated in Table 2.

By the above steps, the ferrite sintered magnet of Example 1 was fabricated.

Measurement of the Magnetic Properties

After the upper side and the lower side of the cylindrical ferrite sintered magnet were processed, the residual magnetic flux density Br (mT) and the coercivity HcJ (kA/m) of the ferrite sintered magnet were measured. The measurement used a B-H tracer whose maximum applied magnetic field was 25 kOe. The Br and HcJ of Example 1 are shown in Table 2.

Analysis of the Composition of the Whole Ferrite Sintered Magnet

The composition of the whole ferrite sintered magnet was analyzed by an XRF method. It was confirmed that the composition of the metal components contained in the ferrite sintered magnet of Example 1 was represented by the formula (1c) and values of 1-w-x-y, w, x, y, z and m were values indicated in Table 1. That is, it was confirmed that the composition of the whole ferrite sintered magnet was represented by formula (1d).

$$Ca_{1-w-x-y}La_wSr_xBa_yFe_zCo_mO_{19} \quad (1d)$$

Analysis of a Cross Section of the Ferrite Sintered Magnet

Figure 4:
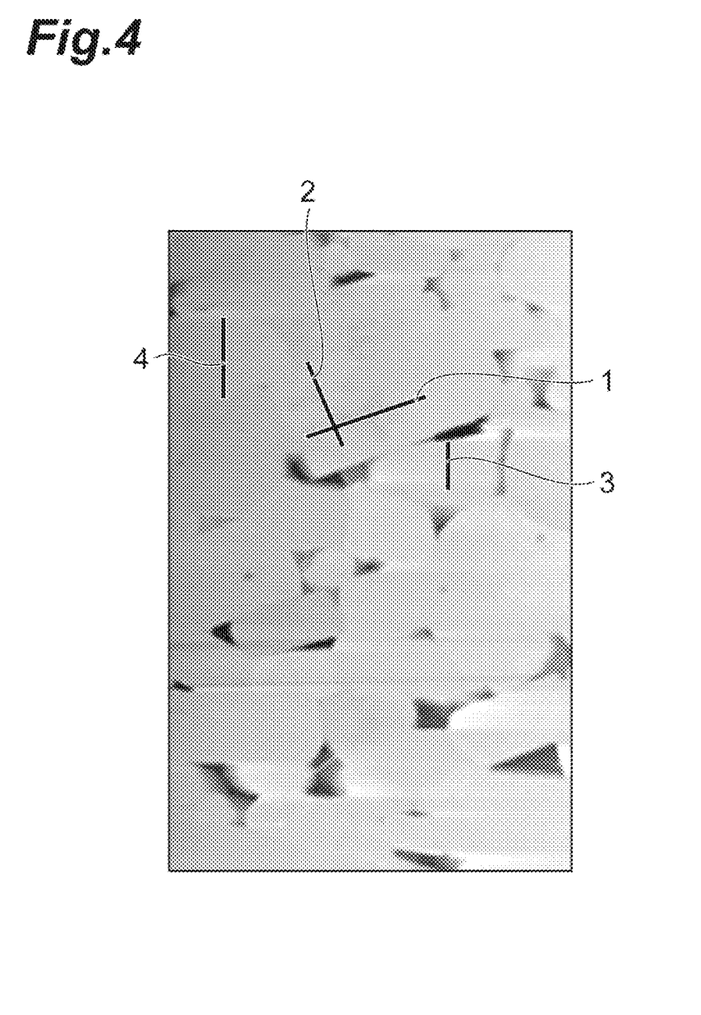
FIG. 4 is an image (a cross section photographed by a transmission electron microscope) of a part of a cross section of the ferrite sintered magnet of Example 1 of the present invention.

The ferrite sintered magnet was cut in the direction perpendicular to the upper side and the lower side of the cylindrical ferrite sintered magnet. The resultant cross section of the ferrite sintered magnet was observed by a scanning electron microscope and a transmission electron microscope. An image of the cross section of the ferrite sintered magnet of Example 1 photographed by the scanning electron microscope is shown in FIG. 3A. An image of the cross section of the ferrite sintered magnet of Example 1 photographed by the transmission electron microscope is shown in FIG. 4. As shown in FIG. 3A, it was also confirmed that the ferrite sintered magnet contained a large number of main phase grains mutually sintered. It was also confirmed that the large number of main phase grains contained core-shell structure grains 5A having a core 7 and a shell 9 covering the core 7. It was also confirmed that the ferrite sintered magnet contained the main phase grains having no core-shell structure. 60 main phase grains on the cross section of the ferrite sintered magnet of Example 1 were randomly selected and the number of the core-shell structure grains among the 60 main phase grains was counted. There was calculated the proportion R-CS of the number of the core-shell structure grains out of the total number of the main phase grains. The RCS of Example 1 is shown in Table 2.

As shown in FIG. 4, linear analysis of the internal composition of the core-shell structure grains was performed along each of 4 line segments (line segments 1 to 4) crossing the core-shell structure grains. The linear analysis used an energy dispersive X-ray spectroscopy (EDS) analyzer which the transmission electron microscope was equipped with. In every linear analysis along the line segments 1 to 4, the following features 1 to 6 were confirmed.

Feature 1: the core contained La, Sr, Co and Ca.
Feature 2: the shell contained La, Sr, Co and Ca.
Feature 3: the content (unit: atom %) of Sr in the core was likely to be higher than the content (unit: atom %) of Sr in the shell.
Feature 4: the content (unit: atom %) of Ca in the shell was likely to be higher than the content (unit: atom %) of Ca in the core.
Feature 5: the content (unit: atom %) of Sr in the core was likely to be higher than the content (unit: atom %) of Ca in the core.
Feature 6: the content (unit: atom %) of Ca in the shell was likely to be higher than the content (unit: atom %) of Sr in the shell.

By the above linear analyses along the line segments 1 to 4, there was measured a minimum value of the content (unit: atom %) of La in the core of each core-shell structure grain. [La]c was calculated by averaging minimum values of the contents of La in the cores of the four core-shell structure grains.

By the above linear analyses along the line segments 1 to 4, there was measured a minimum value of the content (unit: atom %) of Co in the core of each core-shell structure grain. [Co]c was calculated by averaging minimum values of the contents of Co in the cores of the four core-shell structure grains.

By the above linear analyses along the line segments 1 to 4, there was measured a maximum value of the content (unit: atom %) of Sr in the core of each core-shell structure grain. [Sr]c was calculated by averaging maximum values of the contents of Sr in the cores of the four core-shell structure grains.

By the above linear analyses along the line segments 1 to 4, there was measured a minimum value of the content (unit: atom %) of Ca in the core of each core-shell structure grain. [Ca]c was calculated by averaging minimum values of the contents of Ca in the cores of the four core-shell structure grains.

By the above linear analyses along the line segments 1 to 4, there was measured a maximum value of the content (unit: atom %) of La in the shell of each core-shell structure grain. [La]s was calculated by averaging maximum values of the contents of La in the shells of the four core-shell structure grains.

By the above linear analyses along the line segments 1 to 4, there was measured a maximum value of the content (unit: atom %) of Co in the shell of each core-shell structure grain. [Co]s was calculated by averaging maximum values of the contents of Co in the shells of the four core-shell structure grains.

By the above linear analyses along the line segments 1 to 4, there was measured a minimum value of the content (unit: atom %) of Sr in the shell of each core-shell structure grain.

[Sr]s was calculated by averaging minimum values of the contents of Sr in the shells of the four core-shell structure grains.

By the above linear analyses along the line segments 1 to 4, there was measured a maximum value of the content (unit: atom %) of Ca in the shell of each core-shell structure grain. [Ca]s was calculated by averaging maximum values of the contents of Ca in the shells of the four core-shell structure grains.

[La]c, [Co]c, [Sr]c, [Ca]c, [La]s, [Co]s, [Sr]s and [Ca]s of Example 1 are shown in Table 3. Each ratio calculated from the numerical values in Table 3 is shown in Table 4 and Table 5.

Example 2

In the case of Example 2, the raw materials of the main phase were each weighed so that values of 1-w-x-y, w, x, y, z and m in the formula (1c) were values indicated in Table 1. In the case of Example 2, the proportion (unit: parts by mass) of $SiO_2$ based on 100 parts by mass of the total mass of the raw materials of the main phase was adjusted to a value indicated in Table 1. In the case of Example 2, the total amount of the raw materials of the main phase and $H_3BO_3$ and $Al_2O_3$ were collectively mixed before the calcination step. That is, in Example 2, no addition (afteraddition) of raw materials of the main phase to the calcined body was performed. In the case of Example 2, the rate of temperature increase, the firing temperature and the rate of temperature decrease in the firing step were regulated to values indicated in Table 2.

Figure 5:
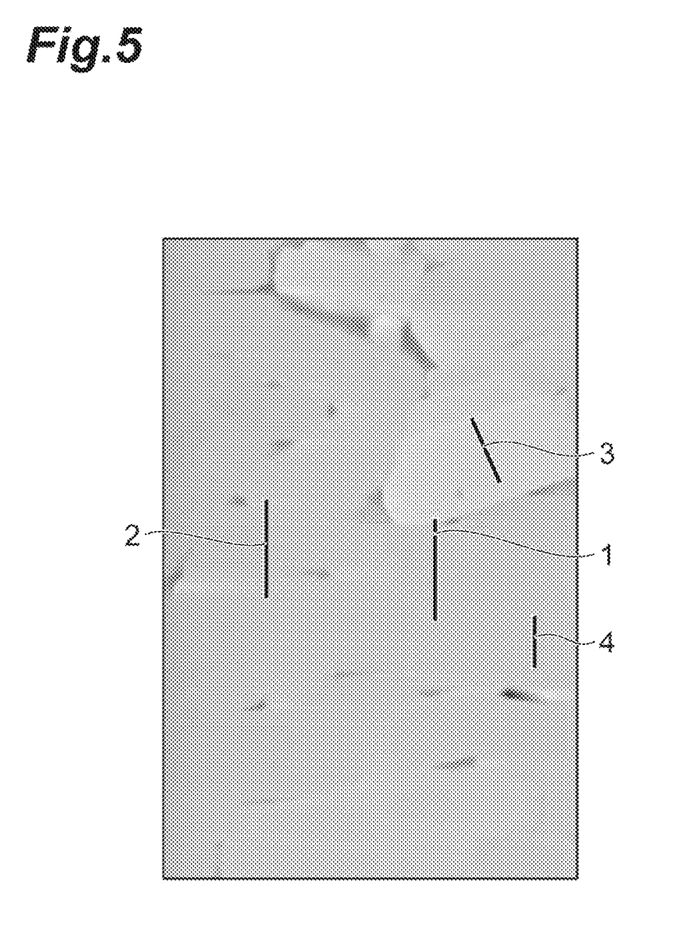
FIG. 5 is an image (a cross section photographed by a transmission electron microscope) of a part of a cross section of a ferrite sintered magnet of Example 2 of the present invention.

A ferrite sintered magnet of Example 2 was fabricated by the same method as in Example 1, except for the above items. The measurement and analysis of the ferrite sintered magnet of Example 2 were performed by the same methods as in Example 1. The results of the measurement and analysis of Example 2 are shown in Tables 2 to 5. It was confirmed that the composition of the metal components contained in the ferrite sintered magnet of Example 2 was represented by the formula (1c), and the values of 1-w-x-y, w, x, y, z and m were values indicated in Table 1. It was confirmed that the ferrite sintered magnet of Example 2 contained the core-shell structure grains. It was also confirmed that the ferrite sintered magnet of Example 2 contained a large number of the main phase grains having no core-shell structure. The linear analysis of the composition of the interior of the core-shell structure grains of Example 2 was performed along each line segment 1 to 4 indicated in FIG. 5. Also in the linear analysis of Example 2, the above features 1 to 6 were confirmed as in Example 1.

Example 3

In the case of Example 3, the raw materials of the main phase were each weighed so that values of 1-w-x-y, w, x, y, z and m in the formula (1c) were values indicated in Table 1. In the case of Example 3, the proportion (unit: parts by mass) of $SiO_2$ based on 100 parts by mass of the total mass of the raw materials of the main phase was adjusted to a value indicated in Table 1. In the case of Example 3, the total amount of the raw materials of the main phase and $H_3BO_3$ and $Al_2O_3$ were collectively mixed before the calcination step. That is, in Example 3, no addition (afteraddition) of raw materials of the main phase to the calcined body was performed. In the case of Example 3, the rate of temperature increase, the firing temperature and the rate of temperature decrease in the firing step were regulated to values indicated in Table 2.

A ferrite sintered magnet of Example 3 was fabricated by the same method as in Example 1, except for the above items. The measurement and analysis of the ferrite sintered magnet of Example 3 were performed by the same methods as in Example 1. The results of the measurement and analysis of Example 3 are shown in Tables 2 to 5.

Figure 6:
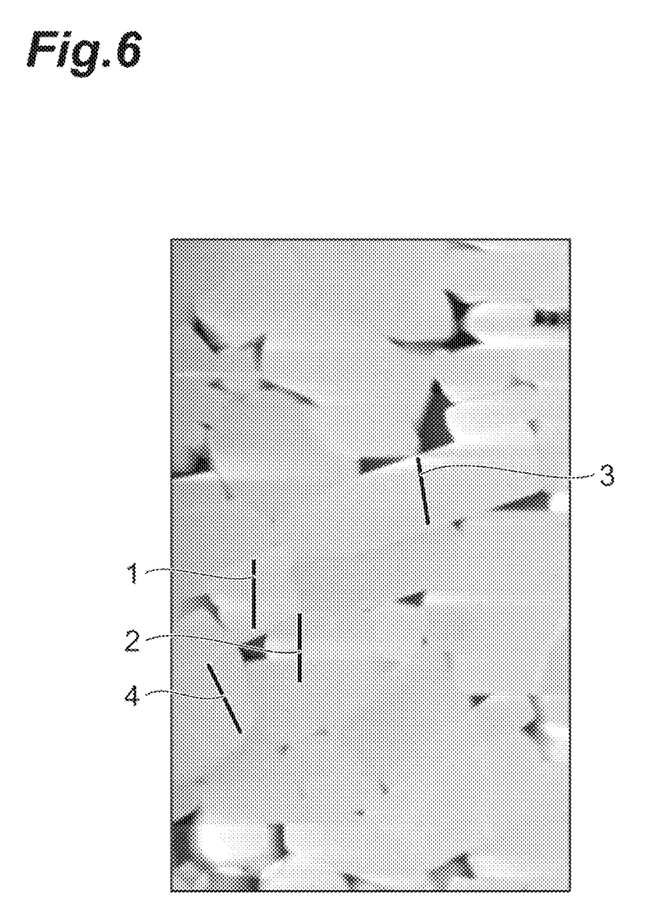
FIG. 6 is an image (a cross section photographed by a transmission electron microscope) of a part of a cross section of a ferrite sintered magnet of Example 3 of the present invention.

It was confirmed that the composition of the metal components contained in the ferrite sintered magnet of Example 3 was represented by the formula (1c), and the values of 1-w-x-y, w, x, y, z and m in the formula (1c) were values indicated in Table 1. It was confirmed that the ferrite sintered magnet of Example 3 contained the core-shell structure grains. It was also confirmed that the ferrite sintered magnet of Example 3 contained a large number of the main phase grains having no core-shell structure. The linear analysis of the composition of the interior of the core-shell structure grains of Example 3 was performed along each line segment 1 to 4 indicated in FIG. 6. Also in the linear analysis of Example 3, the above features 1 to 6 were confirmed as in Example 1.

Comparative Example 1

In the case of Comparative Example 1, the raw materials of the main phase were each weighed so that values of 1-w-x-y, w, x, y, z and m in the formula (1c) were values indicated in Table 1. In the case of Comparative Example 1, the proportion (unit: parts by mass) of $SiO_2$ based on 100 parts by mass of the total mass of the raw materials of the main phase was adjusted to a value indicated in Table 1. In the case of Comparative Example 1, the rate of temperature increase, the firing temperature and the rate of temperature decrease in the firing step were regulated to values indicated in Table 2.

Figure 3B:
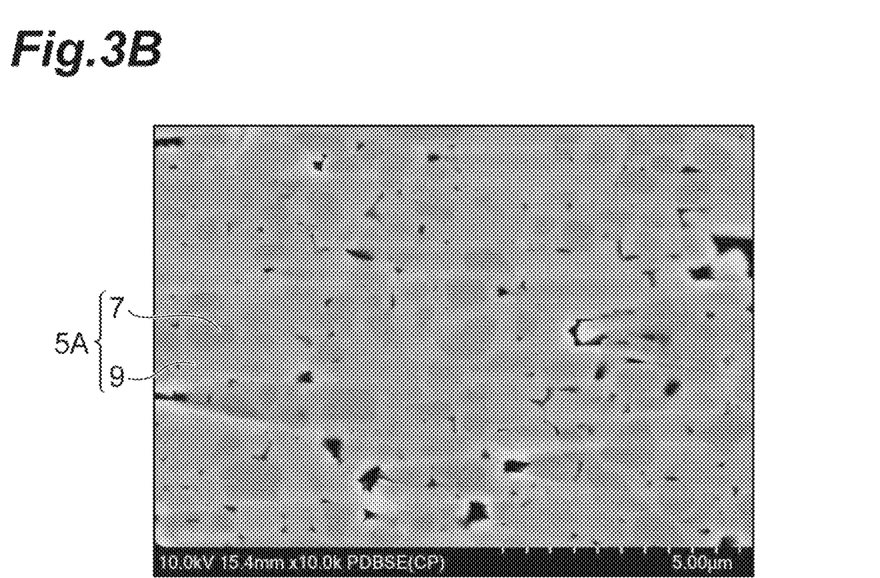
FIG. 3B is an image (a cross section photographed by a scanning electron microscope) of a part of a cross section of a ferrite sintered magnet of Comparative Example 1.

A ferrite sintered magnet of Comparative Example 1 was fabricated by the same method as in Example 1, except for the above items. Also in the case of Comparative Example 1, afteraddition of the raw materials of the main phase was performed in the pulverization step as in Example 1. The measurement and analysis of the ferrite sintered magnet of Comparative Example 1 were performed by the same methods as in Example 1. There is shown in FIG. 3B, an image of a cross section of the ferrite sintered magnet of Comparative Example 1 photographed by a scanning electron microscope. The results of the measurement and analysis of Comparative Example 1 are shown in Tables 2 to 5. It was confirmed that the composition of the metal components contained in the ferrite sintered magnet of Comparative Example 1 was represented by the formula (1c), and the values of 1-w-x-y, w, x, y, z and m in the formula (1c) were values indicated in Table 1. It was confirmed that the ferrite sintered magnet of Comparative Example 1 contained the core-shell structure grains. It was also confirmed that the ferrite sintered magnet of Comparative Example 1 contained a large number of the main phase grains having no core-shell structure.

TABLE 1

| | Ca 1-w-x-y | La w | Sr x | Ba y | Fe z | Co m | In terms of SiO$_2$ | In terms of Al$_2$O$_3$ | In terms of H$_3$BO$_3$ |
|---|---|---|---|---|---|---|---|---|---|
| | | | | | Unit | | | | |
| | atomic ratio | atomic ratio | atomic ratio | atomic ratio | atomic ratio | atomic ratio | parts by mass | parts by mass | Parts By mass |
| Example 1 | 0.481 | 0.379 | 0.139 | 0.0007 | 9.40 | 0.22 | 0.67 | 0 | 0 |
| Example 2 | 0.473 | 0.378 | 0.149 | 0 | 9.37 | 0.23 | 0.65 | 0.05 | 0.16 |
| Example 3 | 0.473 | 0.378 | 0.149 | 0 | 9.37 | 0.23 | 0.65 | 0.05 | 0.16 |
| Comparative Example 1 | 0.103 | 0.131 | 0.763 | 0.0026 | 10.50 | 0.11 | 0.52 | 0 | 0 |

TABLE 2

| | Rate of temperature increase | Firing temperature | Rate of temperature decrease | R-CS | Br | HcJ |
|---|---|---|---|---|---|---|
| | | | Unit | | | |
| | °C./min | °C. | °C./min | % | mT | kA/m |
| Example 1 | 5 | 1220 | 5 | 25.0 | 457 | 392 |
| Example 2 | 0.5 | 1205 | 10 | 14.3 | 468 | 399 |
| Example 3 | 5 | 1215 | 5 | 21.4 | 472 | 305 |
| Comparative Example 1 | 5 | 1220 | 5 | 64.4 | 441 | 361 |

TABLE 3

| | Shell | | | | Core | | | |
|---|---|---|---|---|---|---|---|---|
| | [Co]s | [La]s | [Sr]s | [Ca]s | [Co]c | [La]c | [Sr]c | [Ca]c |
| Example 1 | 4.45 | 5.44 | 1.59 | 3.88 | 2.28 | 1.40 | 6.56 | 1.71 |
| Example 2 | 3.83 | 3.96 | 0.67 | 3.67 | 2.36 | 2.08 | 3.04 | 1.70 |
| Example 3 | 3.57 | 4.03 | 0.62 | 2.74 | 1.69 | 1.39 | 3.78 | 0.94 |
| Comparative Example 1 | 2.40 | 3.25 | — | — | 0.13 | 0.43 | — | — |

TABLE 4

| | [Co]s/[Co]c | [La]s/[La]c | [Sr]s/[Sr]c | [Ca]s/[Ca]c |
|---|---|---|---|---|
| Example 1 | 1.95 | 3.89 | 0.24 | 2.27 |
| Example 2 | 1.62 | 1.90 | 0.22 | 2.16 |
| Example 3 | 2.11 | 2.90 | 0.16 | 2.91 |
| Comparative Example 1 | 18.46 | 7.56 | — | — |

TABLE 5

| | [La]s + [Co]s | [La]c + [Co]c | ([La]s + [Co]s)/([La]c + [Co]c) |
|---|---|---|---|
| Example 1 | 9.89 | 3.68 | 2.69 |
| Example 2 | 7.79 | 4.44 | 1.75 |
| Example 3 | 7.60 | 3.08 | 2.47 |
| Comparative Example 1 | 5.65 | 0.56 | 10.09 |

INDUSTRIAL APPLICABILITY

The ferrite sintered magnet according to the present invention is, since being excellent in the magnetic properties, suitable for various applications such as motors.

REFERENCE SIGNS LIST

2 . . . FERRITE SINTERED MAGNET, 2cs . . . CROSS SECTION OF FERRITE SINTERED MAGNET, 5 . . . MAIN PHASE GRAIN, 5A . . . CORE-SHELL STRUCTURE GRAIN, 7 . . . CORE, and 9 . . . SHELL

What is claimed is:
1. A ferrite sintered magnet comprising a plurality of main phase grains containing a ferrite having a hexagonal structure, wherein
at least some of the main phase grains are core-shell structure grains each having a core and a shell covering the core;
a minimum value of a content of La in the core is represented by [La]c atom %;
a minimum value of a content of Co in the core is represented by [Co]c atom %;
a maximum value of a content of La in the shell is represented by [La]s atom %;
a maximum value of a content of Co in the shell is represented by [Co]s atom %;
[La]c+[Co]c is 3.08 atom % or more and 4.44 atom % or less; and
[La]s+[Co]s is 7.60 atom % or more and 9.89 atom % or less.
2. The ferrite sintered magnet according to claim 1, wherein ([La]s+[Co]s)/([La]c+[Co]c) is 1.75 or more and 2.69 or less.

3. The ferrite sintered magnet according to claim 1, wherein
a maximum value of a content of Sr in the core is represented by [Sr]c atom %;
a minimum value of a content of Sr in the shell is represented by [Sr]s atom %; and
[Sr]c is higher than [Sr]s.

4. The ferrite sintered magnet according to claim 1, wherein
a minimum value of a content of Ca in the core is represented by [Ca]c atom %;
a maximum value of a content of Ca in the shell is represented by [Ca]s atom %; and
[Ca]s is higher than [Ca]c.

5. The ferrite sintered magnet according to claim 1, wherein
a maximum value of a content of Sr in the core is represented by [Sr]c atom %;
a minimum value of a content of Ca in the core is represented by [Ca]c atom %; and
[Sr]c is higher than [Ca]c.

6. The ferrite sintered magnet according to claim 1, wherein
a minimum value of a content of Sr in the shell is represented by [Sr]s atom %;
a maximum value of a content of Ca in the shell is represented by [Ca]s atom %; and
[Ca]s is higher than [Sr]s.

7. The ferrite sintered magnet according to claim 1, wherein
at least some of metal components contained in the ferrite sintered magnet is represented by formula (1):

$$Ca_{1-w-x-y}R_wSr_xBa_yFe_zCo_m \quad (1)$$

wherein R in the formula (1) is at least one element selected from the group consisting of rare earth elements and Bi, and R includes at least La;

w, x, y, z and m in the formula (1) satisfy formulae (2), (3), (4), (5), (6), (7), (8) and (9):

$$0.25 < w < 0.5 \quad (2)$$

$$0.01 < x < 0.35 \quad (3)$$

$$0 \leq y < 0.013 \quad (4)$$

$$y < x \quad (5)$$

$$8.5 < z < 9.9 \quad (6)$$

$$1.0 < w/m < 2.1 \quad (7)$$

$$0.017 < m/z < 0.055 \quad (8)$$

$$0 < 1-w-x-y < 1 \quad (9); \text{ and}$$

the ferrite sintered magnet contains a Si component.

8. The ferrite sintered magnet according to claim 7, wherein w, x and m in the formula (1) satisfy formulae (2a), (3a) and (10):

$$0.350 < w < 0.420 \quad (2a)$$

$$0.120 < x < 0.180 \quad (3a)$$

$$0.200 < m < 0.280 \quad (10); \text{ and}$$

a content of B in the ferrite sintered magnet is 0.037 to 0.181% by mass in terms of $H_3BO_3$.

9. The ferrite sintered magnet according to claim 1, wherein a content of Al in the ferrite sintered magnet is 0.05 to 0.3% by mass in terms of $Al_2O_3$.

10. The ferrite sintered magnet according to claim 1, wherein
a proportion of the number of the core-shell structure grains to the total number of the main phase grains is 1% or more and 21.4% or less, and
the ferrite sintered magnet contains B and Al.

* * * * *